(12) United States Patent
Santini

(10) Patent No.: US 12,065,832 B2
(45) Date of Patent: Aug. 20, 2024

(54) TUBULAR BEAM WITH MECHANICALLY FASTENED END PLATES

(71) Applicant: Patrick J. Santini, West Bend, WI (US)

(72) Inventor: Patrick J. Santini, West Bend, WI (US)

( * ) Notice: Subject to any disclaimer, the term of this patent is extended or adjusted under 35 U.S.C. 154(b) by 299 days.

(21) Appl. No.: 17/848,953

(22) Filed: Jun. 24, 2022

(65) Prior Publication Data

US 2024/0093490 A1    Mar. 21, 2024

(51) Int. Cl.
| | |
|---|---|
| *E04C 3/00* | (2006.01) |
| *E04C 3/08* | (2006.01) |
| *F16B 19/10* | (2006.01) |
| *E04C 3/04* | (2006.01) |

(52) U.S. Cl.
CPC ............ *E04C 3/08* (2013.01); *F16B 19/1036* (2013.01); *E04C 2003/043* (2013.01); *E04C 2003/0465* (2013.01)

(58) Field of Classification Search
CPC ... E04C 3/08; E04C 3/09; E04C 3/125; E04C 3/127; E04C 3/16; E04C 2003/043; E04C 2003/0439; E04C 2003/0465; F16B 19/1036
See application file for complete search history.

(56) References Cited

U.S. PATENT DOCUMENTS

| | | | | | |
|---|---|---|---|---|---|
| 5,205,101 | A | * | 4/1993 | Swan | E04C 3/08 52/126.1 |
| 5,826,384 | A | * | 10/1998 | O'Neill | E04C 3/08 52/645 |
| 7,464,513 | B2 | * | 12/2008 | Rioux | H01Q 1/1242 52/651.1 |
| 8,418,425 | B1 | * | 4/2013 | Santini | E04H 3/28 52/690 |
| 8,707,653 | B2 | * | 4/2014 | Calleja | E04C 3/08 29/897.3 |
| 9,212,491 | B1 | * | 12/2015 | Santini | E04F 11/025 |
| 9,803,365 | B2 | * | 10/2017 | Peltier | E04C 3/36 |
| 11,953,053 | B1 | * | 4/2024 | Perl | F16B 7/00 |
| 2013/0239512 | A1 | * | 9/2013 | Yang | B32B 15/10 428/35.6 |
| 2017/0073971 | A1 | * | 3/2017 | Peltier | E04C 3/36 |

* cited by examiner

*Primary Examiner* — Chi Q Nguyen
(74) *Attorney, Agent, or Firm* — Donald J. Ersler

(57) ABSTRACT

A tubular beam with mechanically fastened end plates preferably includes a tubular member and at least one end plate. At least one cross plate may be secured within the tubular member with fasteners to strengthen thereof. The tubular member may have any suitable cross section including, square, rectangular, hexagonal, triangular or the like. A plurality of hand access openings, a plurality of beam fastening holes and a plurality of fastener holes are formed through a side wall of the tubular member. The end plate is attached to an end of the tubular beam with a plurality of fasteners. A fastener gusset may be formed in inside corners of the tubular member to accommodate a blind fastener hole for attaching the at least one end plate. Each end plate preferably includes a hand access opening, a plurality of plate fastening holes, and a plurality of blind fastener holes and/or fastener holes.

20 Claims, 12 Drawing Sheets

TUBULAR BEAM WITH MECHANICALLY FASTENED END PLATES

BACKGROUND OF THE INVENTION

1. Field of the Invention

The present invention relates generally to the construction of structures and more specifically to a tubular beam with mechanically fastened end plates, which provides increased load capacity.

2. Discussion of the Prior Art

U.S. Pat. No. 8,418,425 ('425 patent) to Santini discloses a tubular beam for the construction of temporary structures. The tubular beam of the '425 patent has been in use for many years. However, the design has drawbacks, because the tubular beam is fabricated from two angle plates that are welded to each other to form a tube. Most current tubular beams include at least one welded face or joint to complete the tubular beam. The end plates are also welded to the ends of the tubular beam. The welded tubular beam does not have the load carrying capability of an extruded tubular beam. Further, there are numerous steps required to prepare the elements, before, after and during welding the elements to each other. An extruded tube used in conjunction with a mechanically fastened end plate eliminates the heat affected zone that is introduced through Mig, TIG, Laser, Friction welding as well as braising operations. Heat affected zones compromise the materials and require extra steps to join the tube and end plates. Having a tubular beam with no heat affected zone allows the full capacity of the beam to be utilized and not derated. The mechanically fastened end plate may also be used for inner beam placement as a cross plate. The use of at least one cross plate is advantageous in combating inter-beam compression, tension and torsion.

Accordingly, there is a clearly felt need in the art for a tubular beam with mechanically fastened end plates, which does not require welding and provides increased load capacity.

SUMMARY OF THE INVENTION

The present invention provides a tubular beam with mechanically fastened end plates, which does not require welding. The tubular beam with mechanically fastened end plates (tubular beam) preferably includes a tubular member and at least one end plate. At least one cross plate may be secured within a length of the tubular member with a plurality of fasteners to strengthen the tubular member. The tubular member may have any suitable cross section including, square, triangular, rectangular, hexagonal or the like. The tubular member would be preferably produced with an extrusion process. A plurality of hand access openings, a plurality of beam fastening holes, a plurality of fastener holes and weight reduction openings are formed through a side wall of the tubular member. Please note, "fastening holes" are for connecting tubular beams to each other, or connecting tubular beams to other mating assemblies. "Fastener holes" are used to join end plates or cross plates to the tubular member. The weight reduction openings may be symmetrical or irregular. The hand access openings, beam fastening holes, fastener holes and weight reduction openings may be formed with metal cutting tools, plasma cutting, water jet, punching, stamping, molding or casting, or any other suitable metal cutting process.

The at least one end plate is attached to at least one end of the tubular beam with a plurality of fasteners. The fasteners used could be threaded fasteners, rivets, interference fasteners, self-tapping fasteners or any other type of suitable fastener. The plurality of fasteners may be parallel to a lengthwise axis of the tubular member, perpendicular to a lengthwise axis of the tubular member or both. A fastener gusset may be formed in the inside corners of the tubular member to accommodate a fastener hole for attaching the at least one end plate. Each end plate includes a plurality of fastener holes and/or a plurality of blind fastener holes. Each end plate may also include a hand access opening, a plurality of fastening holes and at least one weight reduction opening. The plurality of blind fastener holes may be tapped to create threaded taps for a plurality of threaded fasteners, which could be used.

The weight reduction opening may be symmetrical or irregular. Plate fastening holes formed through the end plate must align with a pattern of beam fastening holes on any side of the tubular member. Both end plates and tubular members preferably have hole patterns that overlay onto each other. The beam fastening holes may have any suitable shape, such as circular, square, hexagonal, oval or curved oval. The end plates may have additional fastening holes located on it that do not exactly align with beam fastening holes. The additional fastening holes preferably allow additional angular or axial orientations of the tubular members.

If only parallel fasteners are used, a perimeter of the end plate is preferably the same as an outer perimeter of the tubular member. At least two fastener holes are formed in opposing corners of the end plate. At least two blind fastener holes are formed in opposing corner fastener gussets in the tubular member. If perpendicular fasteners are used, a perimeter of the end plate is sized to be received by an inner perimeter of the tubular member. A plurality of blind fastener holes are formed in at least opposing sides of the end plate. A plurality of fastener holes are formed through at least two opposing sides of the tubular member at an end thereof.

If both parallel and perpendicular fasteners are used, the end plate includes an outer perimeter that is sized to be received by an inner perimeter of the tubular member. At least two end plate tabs extend from opposing corners of the end plate. At least two tab notches are formed in opposing corners of an end of the tubular member to receive the at least two end plate tabs. The blind fastener holes are formed in fastener gussets in at least two corners of the tubular member. At least two fastener holes are formed through opposing corners of the at least two end plate tabs. A plurality of blind fastener holes are formed in opposing sides of the end plate. A plurality of fastener holes are formed through at least two opposing sides of the tubular member at an end thereof. However, a stepped end plate includes a stepped perimeter portion. The stepped perimeter portion is sized to be received by inner perimeter of the tubular member. An outer perimeter of the end plate is the same as an outer perimeter of the tubular member. A plurality of blind fastener holes are formed in at least opposing sides of the stepped perimeter portion. A plurality of fastener holes are formed through at least two opposing sides of the tubular member at an end thereof.

Accordingly, it is an object of the present invention to provide a tubular beam with mechanically fastened end plates, which does not require welding and provides increased load capacity.

These and additional objects, advantages, features and benefits of the present invention will become apparent from the following specification.

DETAILED DESCRIPTION OF THE PREFERRED EMBODIMENTS

Figure 1:
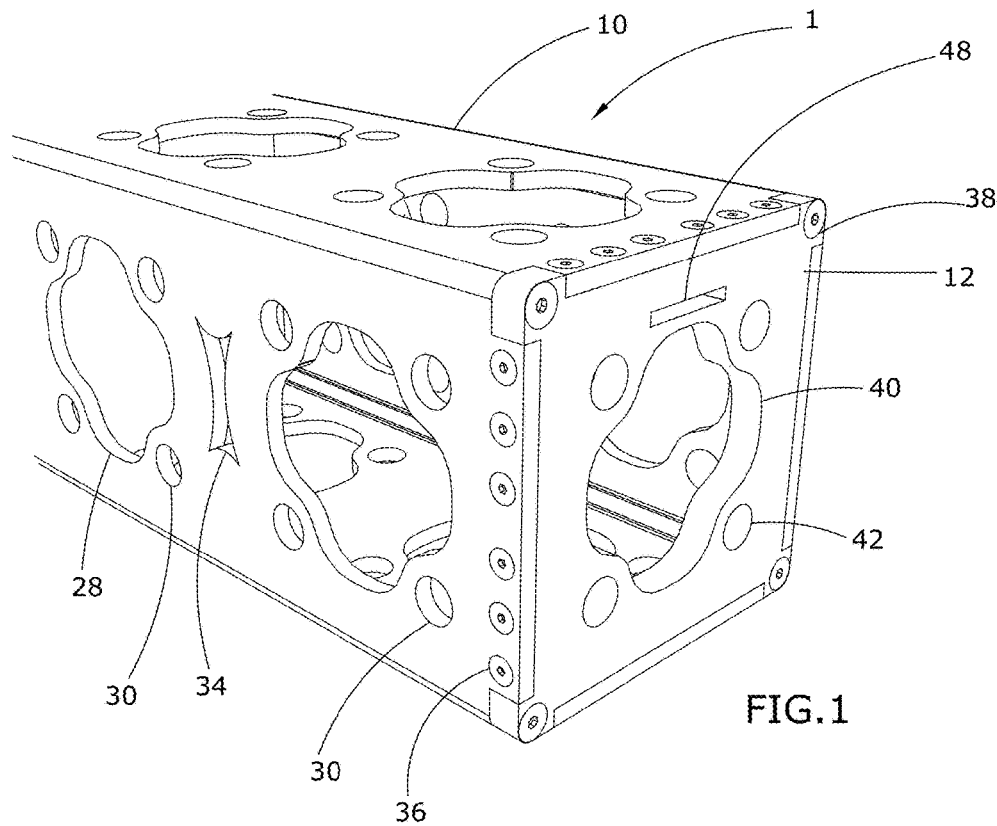
FIG. 1 is a perspective view of a tubular beam with a fastened end plate having both parallel and perpendicular fasteners in accordance with the present invention.
Figure 4:
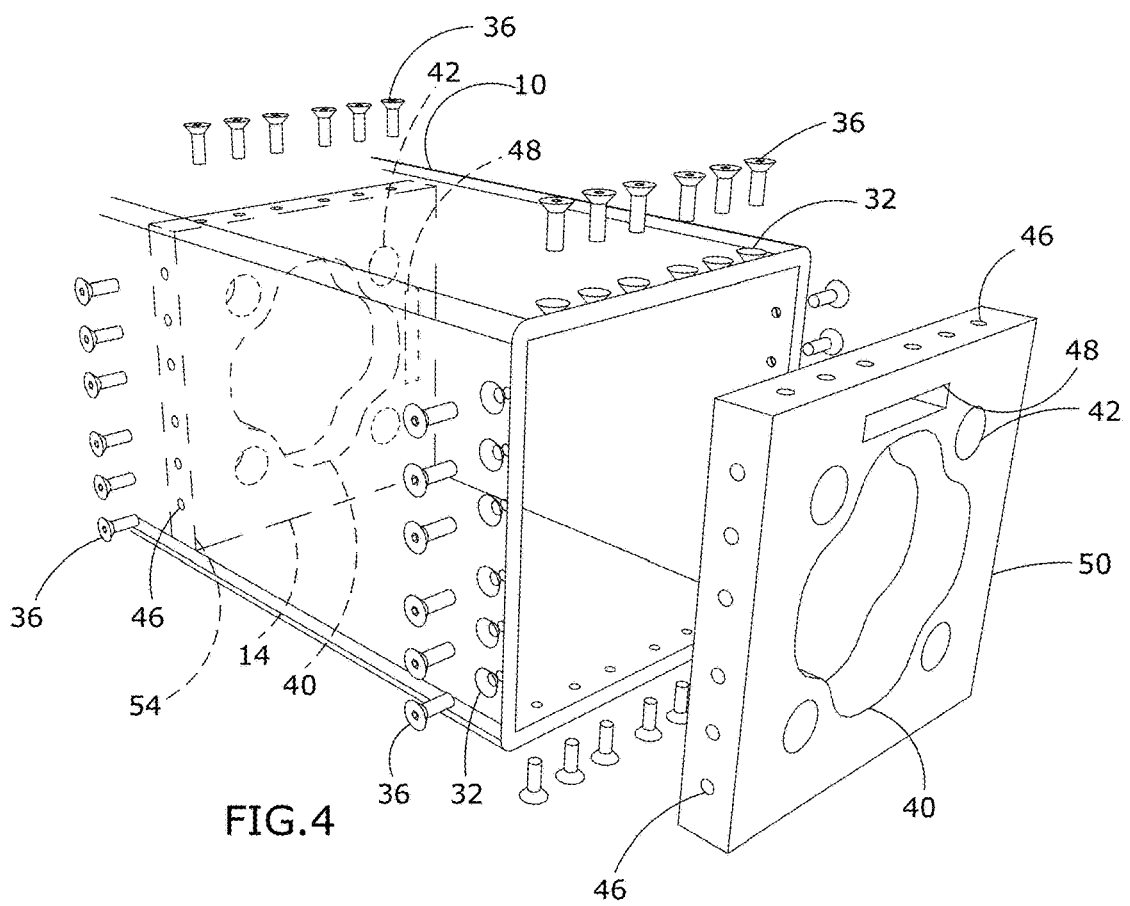
FIG. 4 is a partially exploded perspective view of a tubular beam with a fastened end plate and a cross plate having only perpendicular fasteners in accordance with the present invention.

With reference now to the drawings, and particularly to FIG. 1, there is shown a perspective view of a tubular beam with mechanically fastened end plates (tubular beam) 1. The tubular beam 1 preferably includes a tubular member 10 and at least one end plate 12. With reference to FIG. 4, at least one cross plate 14 may be secured within a length of the tubular member 10 with a plurality of perpendicular fasteners 36 to strengthen the tubular beam 1. With reference to FIGS. 7-10, the tubular beam 1 may include the square tubular member 10, a triangular tubular member 18, a rectangular tubular member 20, a hexagonal tubular member 22 or the like. The square, triangular, rectangular or hexagonal tubular members 10, 18, 20, 22 may include a fastener gusset 24 in each corner thereof to facilitate a blind fastener hole 26. The tubular member 10, 18, 20, 22 is preferably produced as an extrusion. A plurality of hand access openings 28, a plurality of beam fastening holes 30, a plurality of fastener holes 32 and weight reduction openings 34 are formed through a side wall of the tubular member 10, 18, 20, 22. The weight reduction openings 34 may be symmetrical or irregular. The hand access openings 28, the beam fastening holes 30, the fastener holes 32 and the weight reduction openings 34 may be formed with metal cutting tools, plasma cutting, water jet punching, stamping, molding or casting, or any other suitable metal cutting process.

Figure 2:
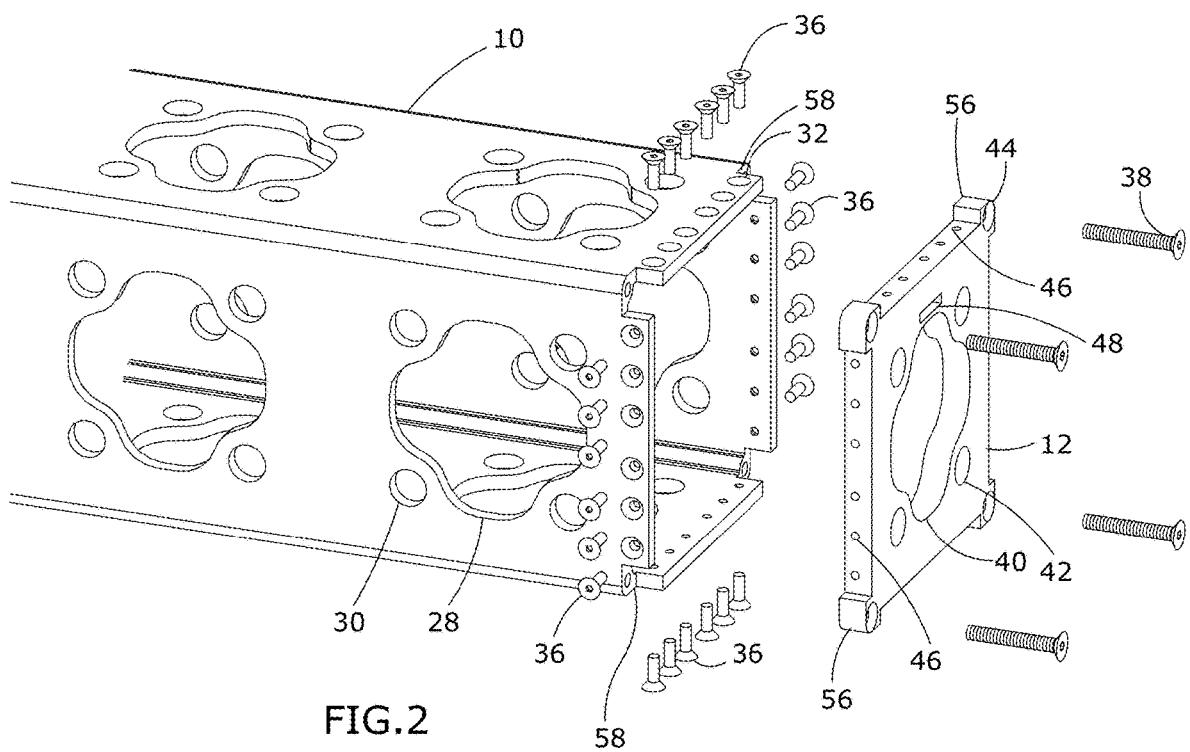
FIG. 2 is an exploded perspective view of a tubular beam with a fastened end plate having both parallel and perpendicular fasteners in accordance with the present invention.

With reference to FIG. 2, the at least one end plate 12 is attached to the at least one end of the tubular member 10 with the plurality of perpendicular fasteners 36 and a plurality of parallel fasteners 38. The square end plate 12 would be modified to a triangular, rectangular or hexagonal shape for attachment to the triangular, rectangular or hexagonal tubular members 18, 20, 22 with the plurality of perpendicular fasteners 36 and the plurality of parallel fasteners 38. The plurality of perpendicular fasteners 36 are perpendicular to a lengthwise axis of the tubular member 10. The plurality of parallel fasteners 38 are parallel to a lengthwise axis of the tubular member 10. The end plate 12 preferably includes a hand access opening 40, a plurality of plate fastening holes 42, a plurality of parallel fastener holes 44, a plurality of perpendicular blind fastener holes 46 and at least one weight reduction opening 48. A pattern of the fastening holes 42 will mate with a pattern of the beam fastening holes 30. At least two parallel fastener holes 44 are formed in opposing corners of the end plate 12. At least two blind fastener holes 26 are formed in opposing corner fastener gussets in the tubular member 10. At least two sets of perpendicular blind fastener holes 46 are formed in opposing sides of the end plate 12. The weight reduction opening 48 may be symmetrical or irregular. The plate fastening holes 42 formed through the end plate 12 must align with a pattern of beam fastening holes 30 on any side of the tubular member 10.

Figure 3:
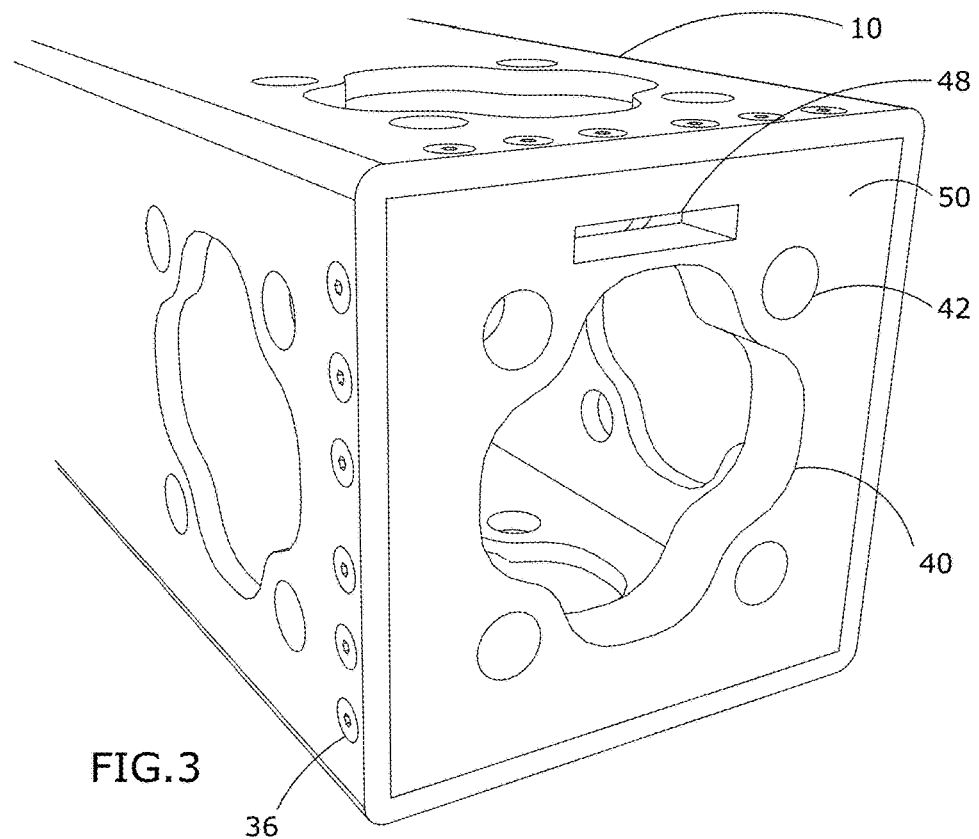
FIG. 3 is a perspective view of a tubular beam with a fastened end plate having only perpendicular fasteners in accordance with the present invention.

With reference to FIGS. 3-4, an end plate 50 preferably includes the hand access opening 40, the plurality of plate fastening holes 42, the plurality of perpendicular blind fastener holes 46 and the at least one weight reduction opening 48. The weight reduction opening 48 may be symmetrical or irregular. The plate fastening holes 42 formed through the end plate 50 must align with a pattern of beam fastening holes 30 on any side of the tubular member 10. A perimeter of the end plate 50 is sized to be received by an inner perimeter of the tubular member 10. The blind fastener holes 46 are formed in at least opposing sides of the end plate 50. At least one cross plate 14 may be secured within a length of the tubular member 10 with the plurality of perpendicular fasteners 36 to strengthen the tubular member 10. The cross plate 14 preferably includes the hand access opening 40, the plurality of plate fastening holes 42 and the weight reduction opening 48. The cross plate 14 includes clearance chamfers 54 formed on each corner, if the cross plate 14 is used in a tubular member 10, 18, 20, 22 having fastener gussets 24.

Figure 5:
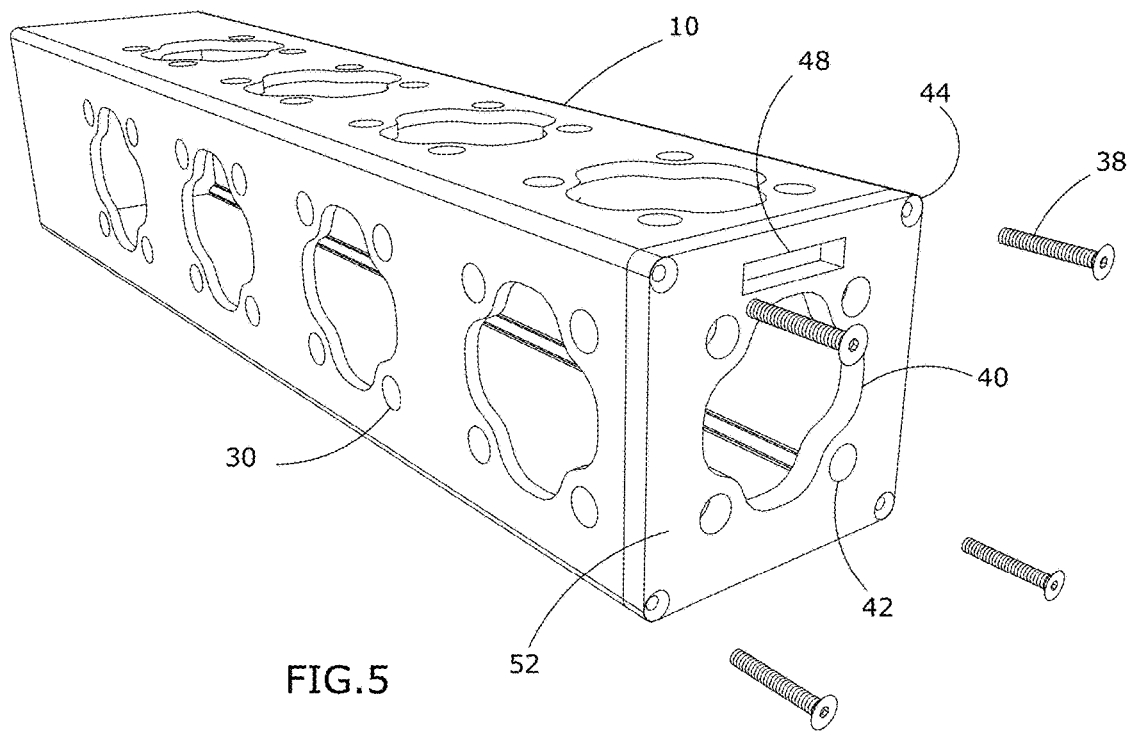
FIG. 5 is a partially exploded perspective view of a tubular beam with a fastened end plate having only parallel fasteners in accordance with the present invention.
Figure 6:
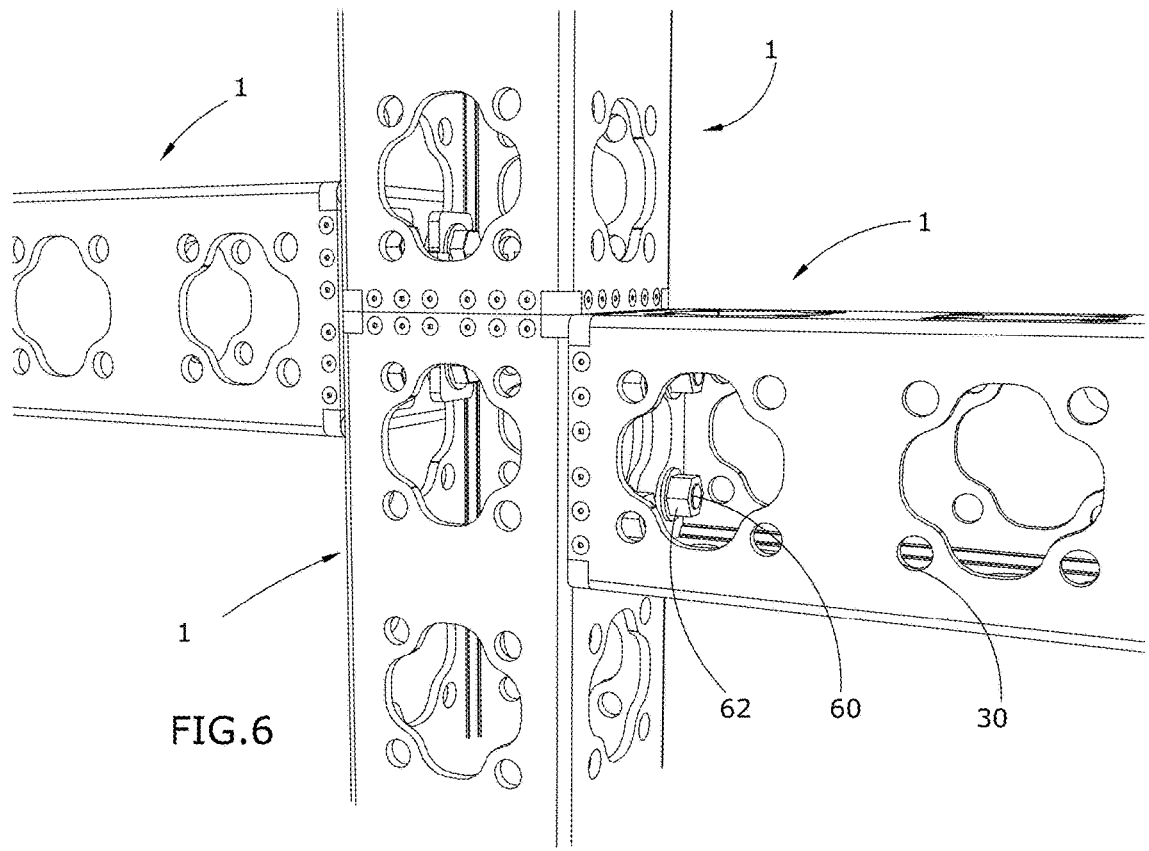
FIG. 6 is a perspective view of a plurality of tubular beams with fastened end plates fastened to each other to create a structure in accordance with the present invention.
Figure 7:
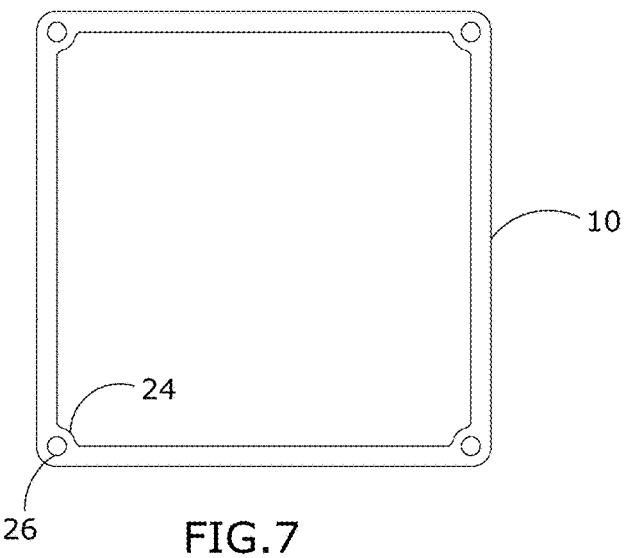
FIG. 7 is an end view of a square extruded tubular member having fastener gussets in the interior corners thereof of a tubular beam in accordance with the present invention.
Figure 8:
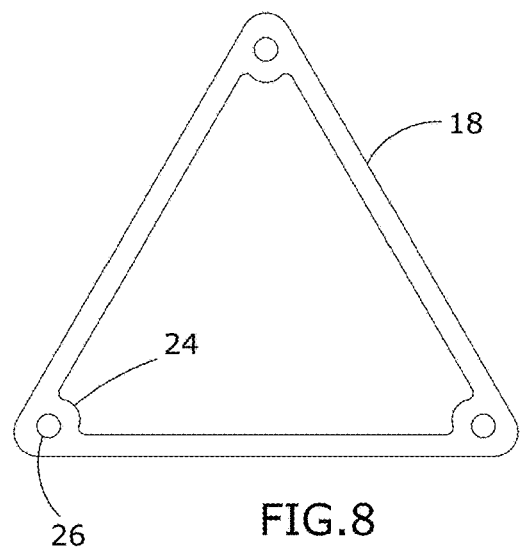
FIG. 8 is an end view of a triangular extruded tubular member having fastener gussets in the interior corners thereof of a tubular beam in accordance with the present invention.
Figure 9:
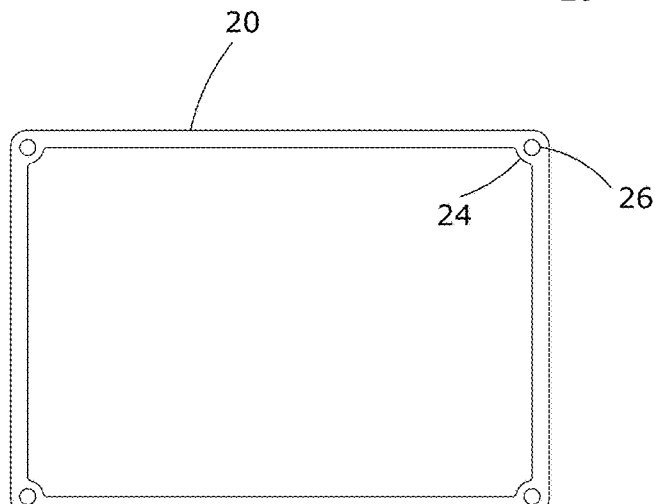
FIG. 9 is an end view of a rectangular extruded tubular member having fastener gussets in the interior corners thereof of a tubular beam in accordance with the present invention.
Figure 10:
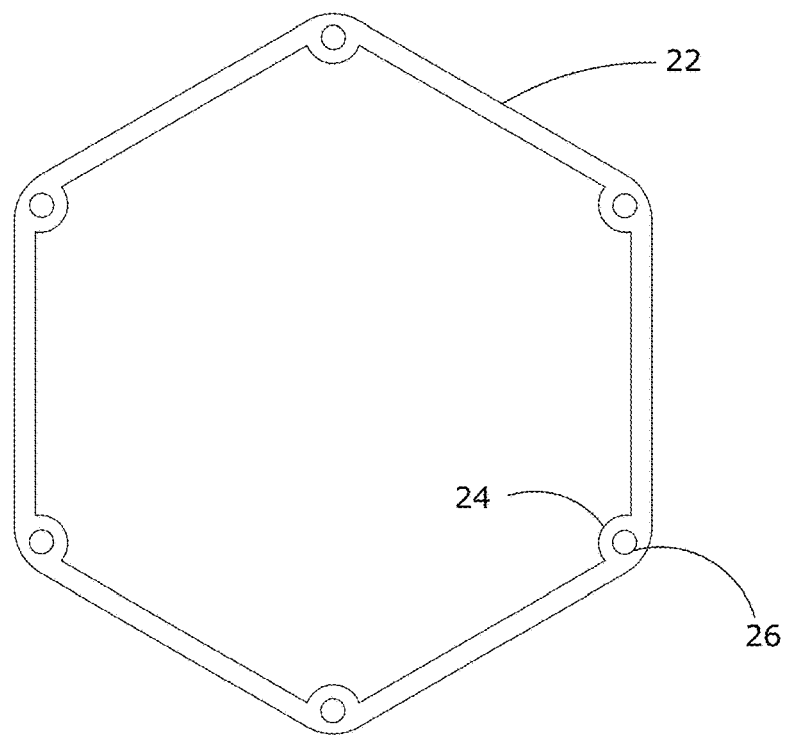
FIG. 10 is an end view of a hexagonal extruded tubular member having fastener gussets in the interior corners thereof of a tubular beam in accordance with the present invention.

With reference to FIG. 5, an end plate 52 preferably includes the hand access opening 40, the plurality of plate fastening holes 42, the plurality of parallel fastener holes 44 and the at least one weight reduction opening 48. The weight reduction opening 48 may be symmetrical or irregular. The plate fastening holes 42 formed through the end plate 52 must align with the pattern of beam fastening holes 30 on any side of the tubular member 10. If only parallel fasteners 38 are used, a perimeter of the end plate 52 is preferably the same as an outer perimeter of the tubular member 10. With reference to FIG. 6, four tubular beams 1 are attached to each other to form a structure utilizing a plurality of fasteners 60 and a plurality of nuts 62. The end plates 12, 50, 52 and tubular members 10, 18, 20, 22 preferably have hole patterns that overlay onto each other. The beam fastening holes 30 may have any suitable shape, such as circular, square, hexagonal, oval or curved oval. The end plates 10, 50, 52 may have additional plate fastening holes 42 located on them that do not exactly align with beam fastening holes 30. The additional plate fastening holes 42 preferably allow additional angular or axial orientations of the tubular members 1.

With reference to FIGS. 1-2, the end plate 12 preferably includes an outer perimeter that is sized to be received by an inner perimeter of the tubular member 10. At least two end plate tabs 56 extend from opposing corners of the end plate 12. At least two tubular tab notches 58 are formed in opposing corners of an end of the tubular member 10 to receive the at least two end plate tabs 56. Blind fastener holes 26 are formed in at least two corners of the tubular member 10. The at least two parallel fastener holes 44 are formed through the at least two end plate tabs 56.

Figure 11:
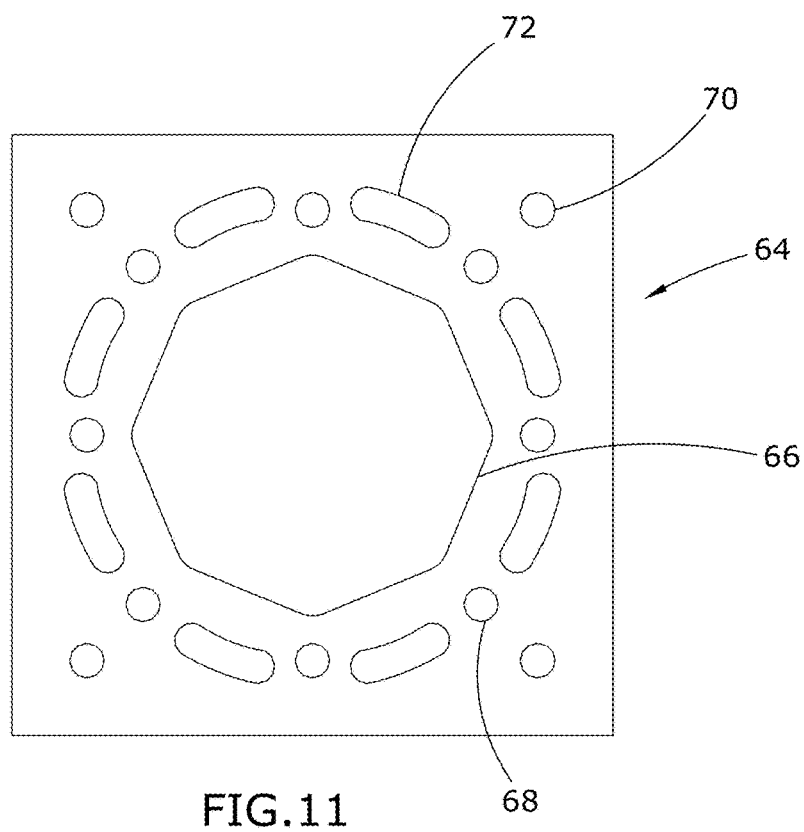
FIG. 11 is a front view of an end plate which includes a different shaped hand access opening and with a multiple hole pattern for attachment engagement with a side bolt hole pattern in accordance with the present invention.

With reference to FIG. 11, an end plate 64, which preferably includes a hand access opening 66, an inner eight bolt pattern 68, an outer four bolt pattern 70 and a plurality of curved fastening slots 72. The plurality of curved fastening slots 72 allow axially rotation relative to a second tubular beam 1 or object. The end plate 64 may be adapted for fastening with parallel fasteners 38, perpendicular fasteners 36 or both. The hand access opening 66 is different from the hand access opening 28. The inner eight bolt pattern 68 will mate with the beam fastener holes 30. The outer four bolt pattern 70 and the curved fastening slots 72 could provide fastening for another size tubular member or object. The hand access openings 28, 40, 66 may have any suitable shape. However, hand access openings 40 in the end plates 12 are optional.

Figure 12:
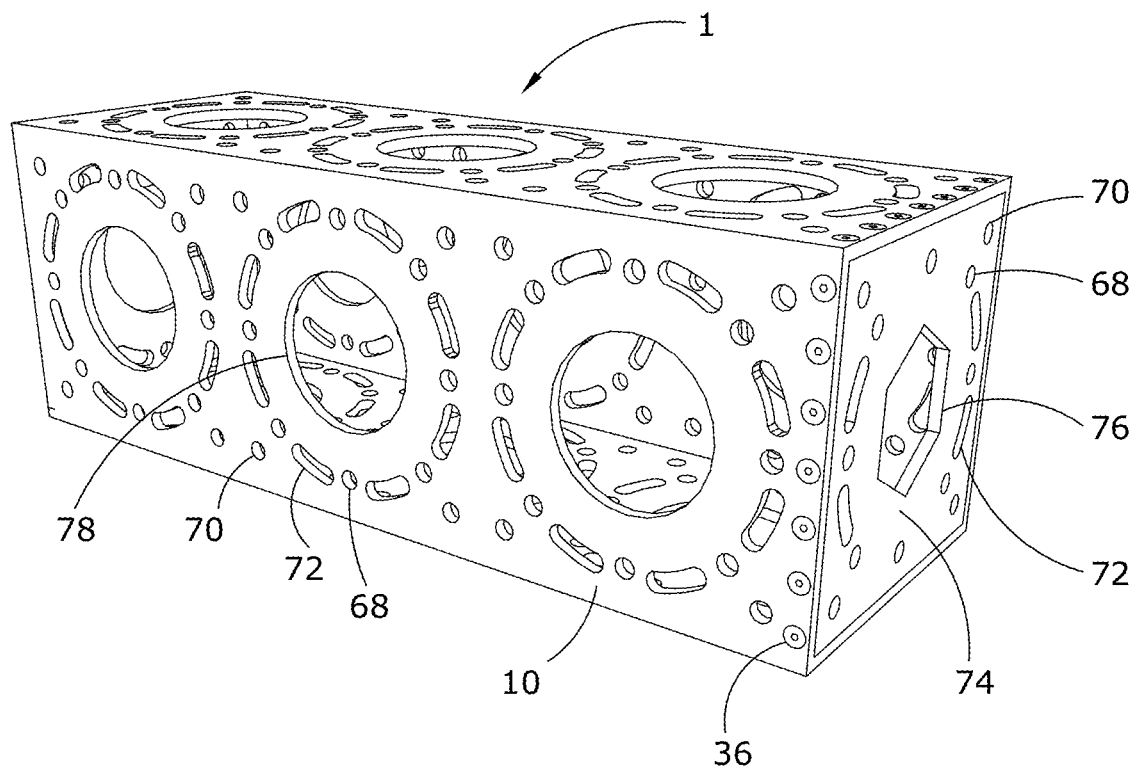
FIG. 12 is a perspective view of a tubular beam with a fastened end plate having perpendicular fasteners in accordance with the present invention.

FIG. 12 illustrates a tubular beam 1 with an end plate 74 perpendicularly attached to an end of the tubular member 10 with the plurality of fasteners 36. The end plate 74 includes the inner eight bolt pattern 68, an outer four bolt pattern 70, four curved fastening slots 72 and a hand access opening 76. The inner eight bolt pattern 68, the outer four bolt pattern 70 and a hand access opening 78 are formed in the side walls of the tubular member 10.

Figure 13:
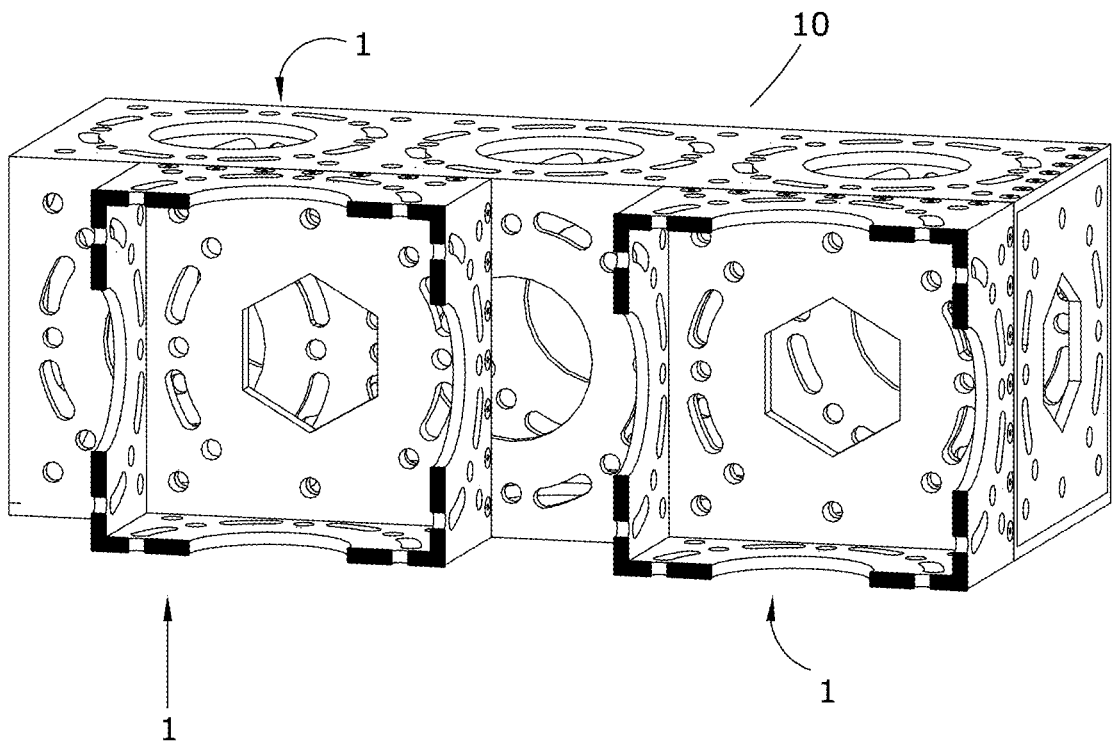
FIG. 13 is a perspective view of a tubular beam with a fastened end plate having perpendicular fasteners and two truncated tubular beams extending from one side of the tubular beam in accordance with the present invention.

FIG. 13 shows the tubular beam 1 and an end of a first truncated tubular beam 1 aligned to a side of the tubular beam 1 and offset from a bolt pattern of the tubular beam 1. A second truncated tubular beam 1 is aligned with the side of the tubular beam 1 and aligned with the bolt pattern of the tubular beam 1.

Figure 14:
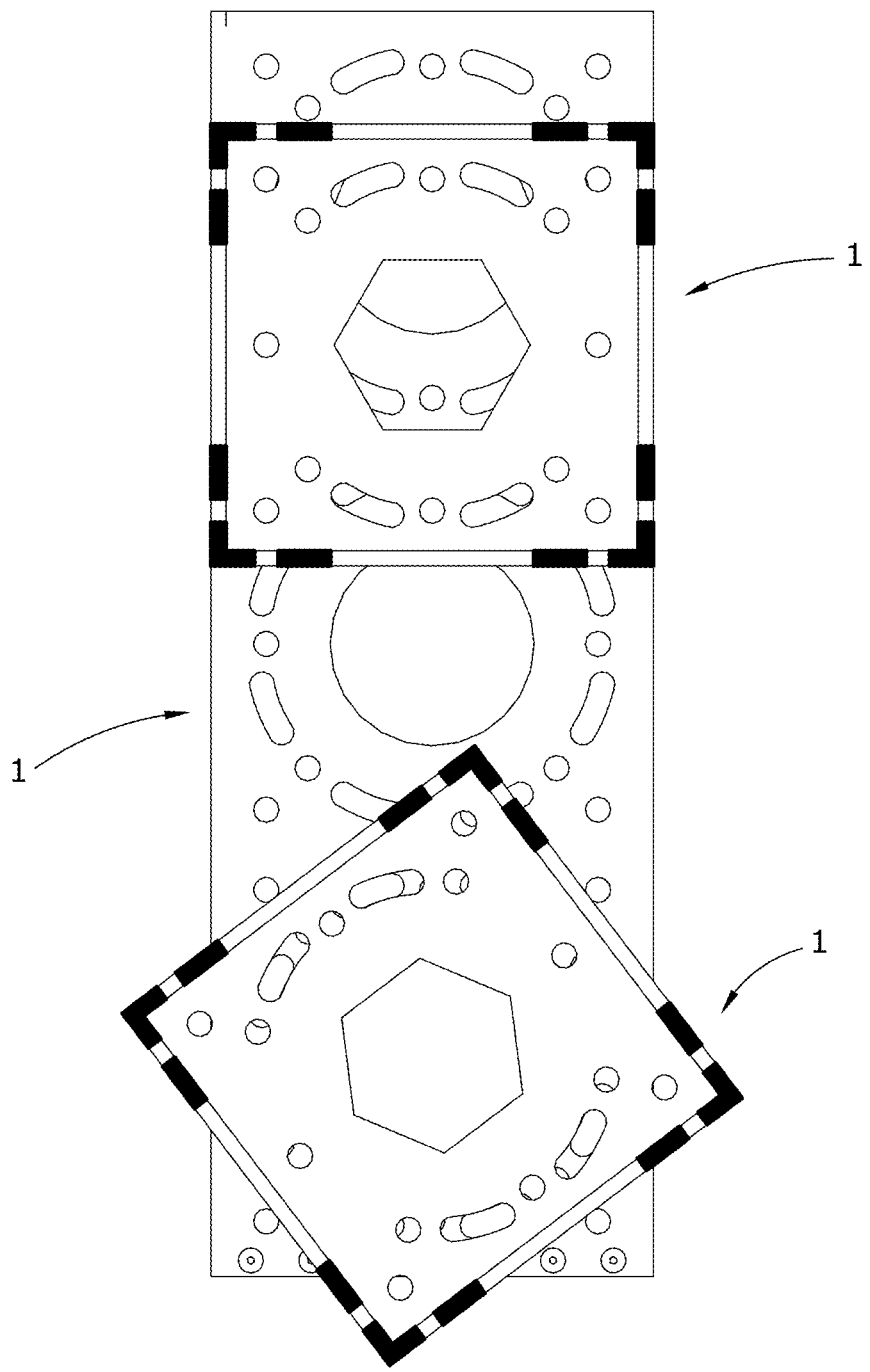
FIG. 14 is a top view of a tubular beam with a fastened end plate having both perpendicular fasteners and two secondary truncated tubular beams extending from one side of the tubular beam, one of the two secondary tubular beams is rotated relative to the tubular beam in accordance with the present invention.
Figure 15:
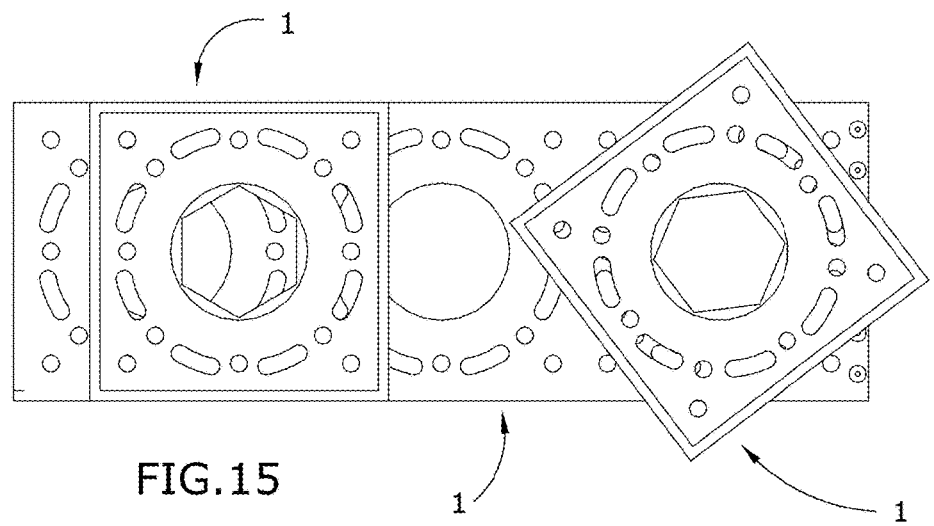
FIG. 15 is a top view of a tubular beam with a fastened end plate having both perpendicular fasteners and two secondary truncated tubular beams extending from one side of the tubular beam, one of the two secondary tubular beams is rotated relative to the tubular beam in accordance with the present invention.
Figure 16:
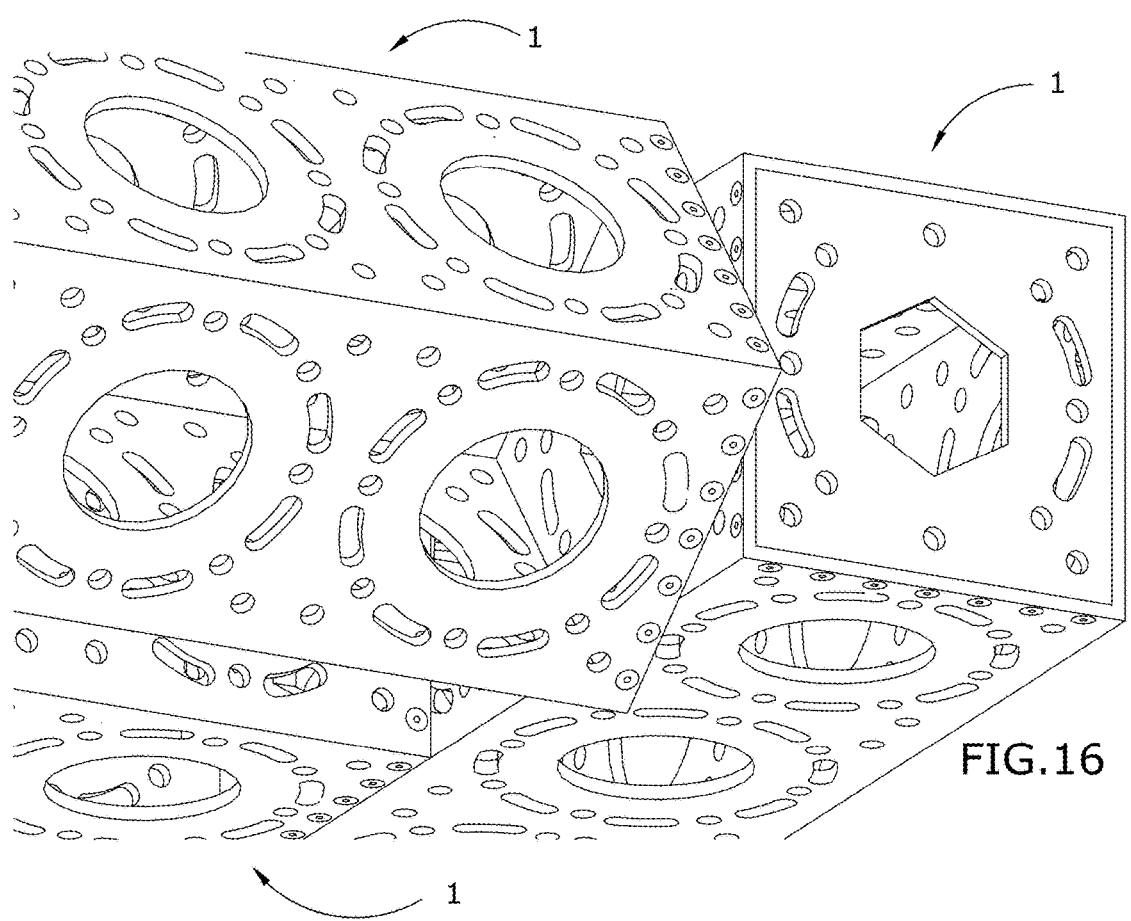
FIG. 16 is a perspective view of a tubular beam with a fastened end plate having both perpendicular fasteners and two secondary truncated tubular beams extending from one side of the tubular beam, one of the two secondary tubular beams is rotated relative to the tubular beam in accordance with the present invention.
Figure 17:
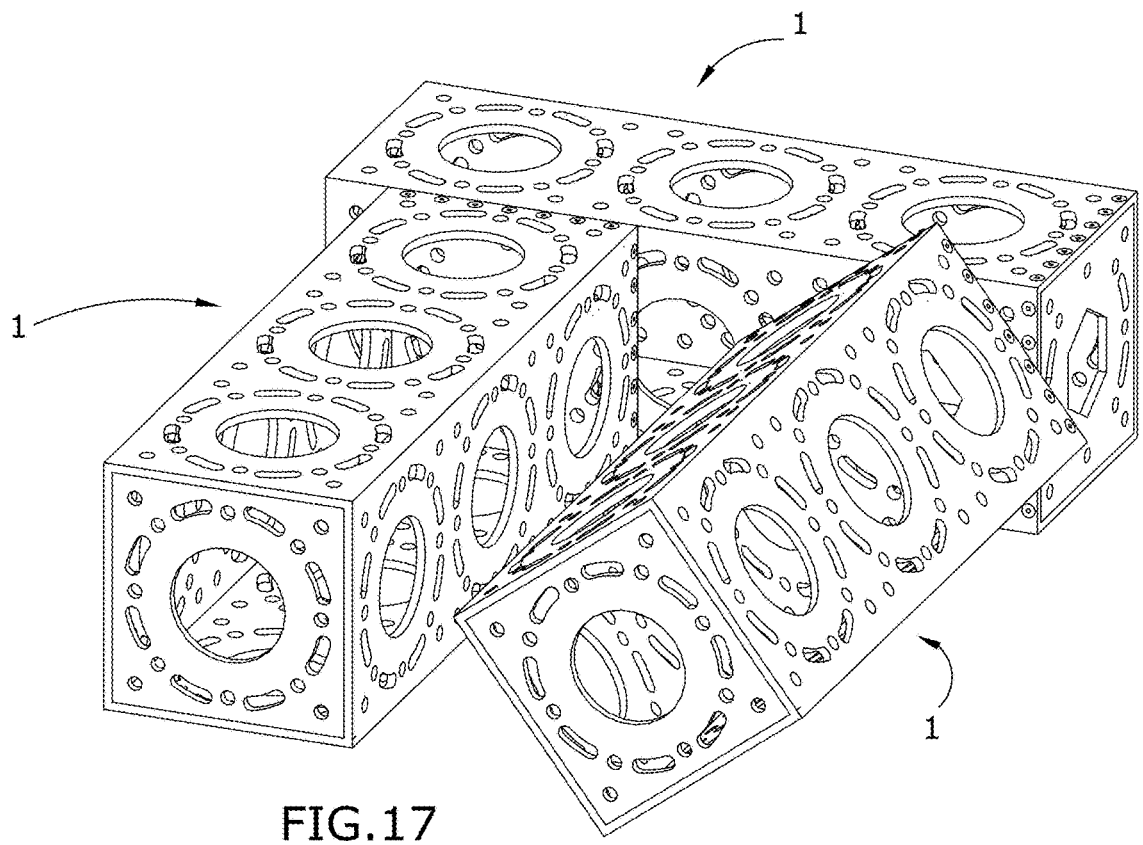
FIG. 17 is a perspective view of a tubular beam with a fastened end plate having both perpendicular fasteners and two secondary truncated tubular beams extending from one side of the tubular beam, one of the two secondary tubular beams is rotated relative to the tubular beam in accordance with the present invention.

FIG. 14 illustrates a base tubular beam 1 and two secondary truncated tubular beams 1 extending from one side of the base tubular beam 1. One of the two secondary tubular beams 1 is rotated relative to the base tubular beam 1, before attachment to the base tubular beam 1. The other secondary tubular beam 1 has a bolt pattern which is offset from a bolt pattern of the base tubular beam 1, before attachment to the base tubular beam 1. FIG. 15 illustrates FIG. 14 with non-truncated second tubular beams 1. FIG. 16 provides an end perspective view of FIG. 15. FIG. 17 illustrates a front perspective view of FIG. 15.

Figure 18:
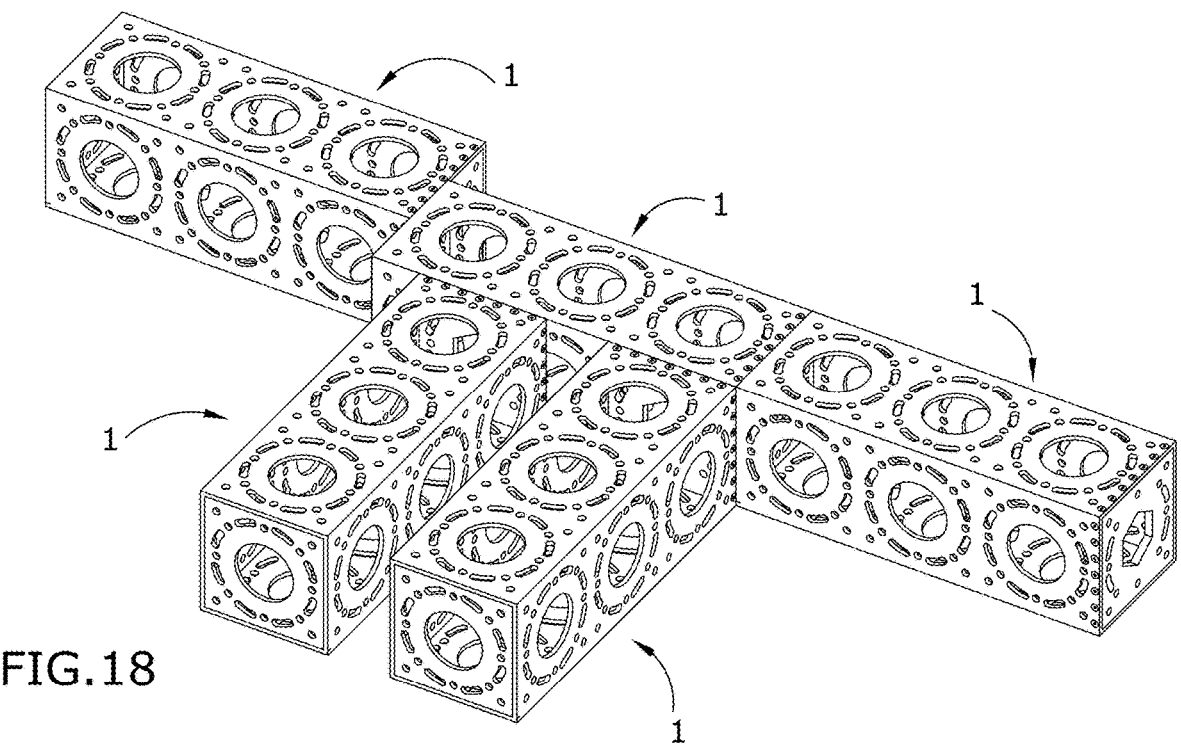
FIG. 18 is a perspective view of a tubular beam with a fastened end plate having both perpendicular fasteners and two secondary truncated tubular beams extending from one side of the tubular beam, one of the two secondary tubular beams is offset from a center of a bolt pattern, a third tubular beam extending from an end of the tubular beam and a fourth extending from an opposing end of the tubular beam and offset from a center of the tubular beam in accordance with the present invention.

FIG. 18 shows a base tubular beam 1 with a first end tubular beam 1 attached to one end of the base tubular beam 1. A second end tubular beam 1 attached to a second end of the base tubular beam 1, but offset from a center longitudinal line thereof. A first perpendicular tubular beam 1 is attached to a side of the base tubular beam 1 at the one end. A second perpendicular beam 1 is attached to a side of the base tubular beam 1, but offset from a repeating bolt pattern thereof.

Figure 19:
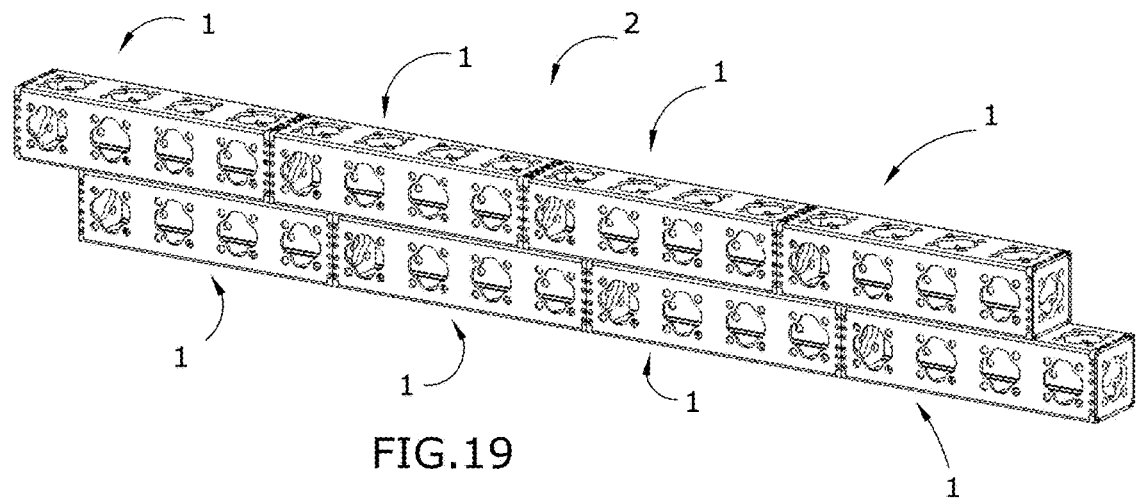
FIG. 19 is a perspective view of a first row of tubular beams attached end to end; a second row of tubular beams attached end to end; and a side of the first and second rows of tubular beams attached to each other and the ends offset to form a singular unit in accordance with the present invention.
Figure 20:
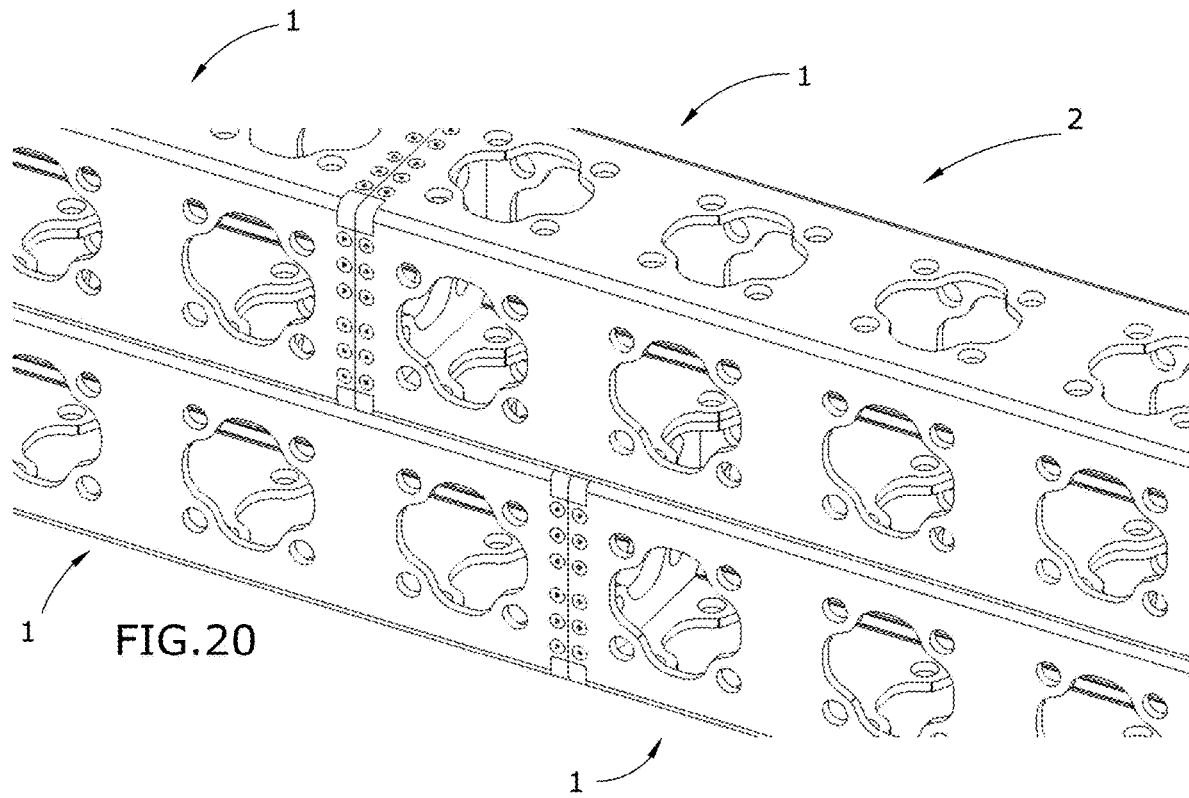
FIG. 20 is a close-up perspective view of FIG. 19 with a first row of tubular beams attached end to end; a second row of tubular beams attached end to end; and a side of the first and second rows of tubular beams attached to each other and the ends offset to form a singular unit in accordance with the present invention.
Figure 21:
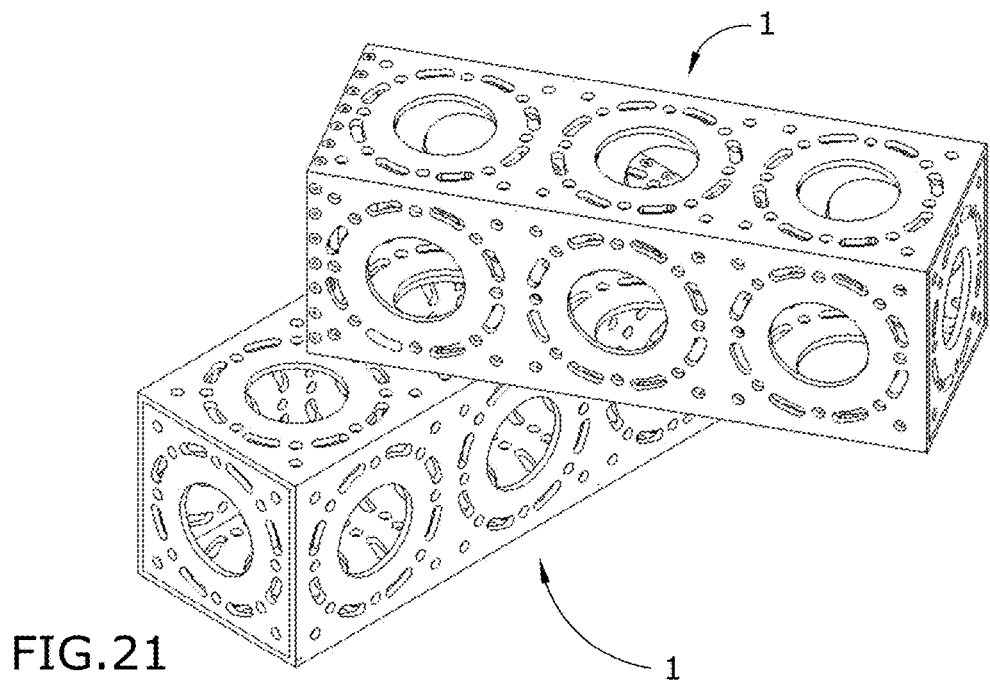
FIG. 21 is a perspective view of a base tubular beam with a fastened end plate and a side of a secondary tubular beam secured to a side of the base tubular beam at an angle relative thereto in accordance with the present invention.

FIGS. 19 and 20 illustrate a perspective view of a first row of tubular beams 1 attached end to end; a second row of tubular beams 1 attached end to end; and a side of the first and second rows of tubular beams 1 attached to each other and the ends offset to form a singular unit 2 in accordance with the present invention. FIG. 21 shows a base tubular beam 1 and a side of a secondary tubular beam 1 secured to a side of the base tubular beam 1 at an angle relative thereto.

Figure 22:
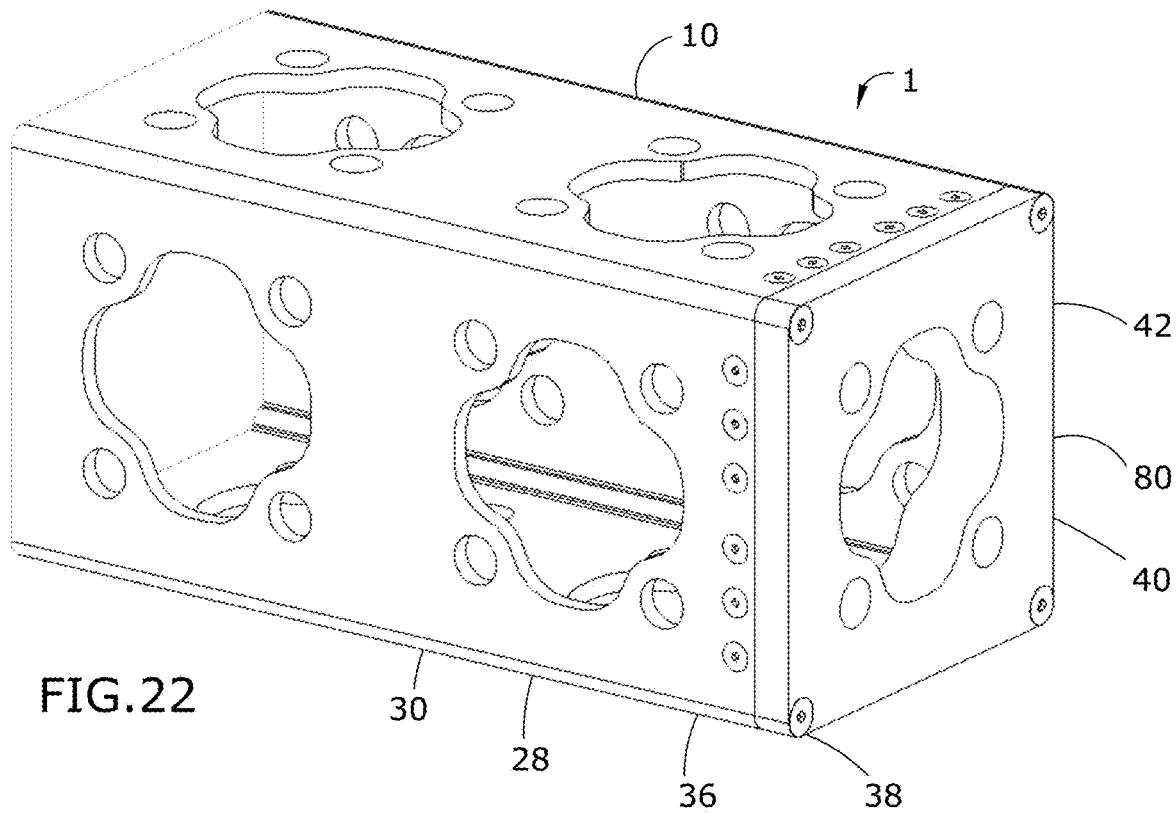
FIG. 22 is a perspective view of a tubular beam with a fastened end plate having both parallel and perpendicular fasteners utilizing a second embodiment of an end plate in accordance with the present invention.
Figure 23:
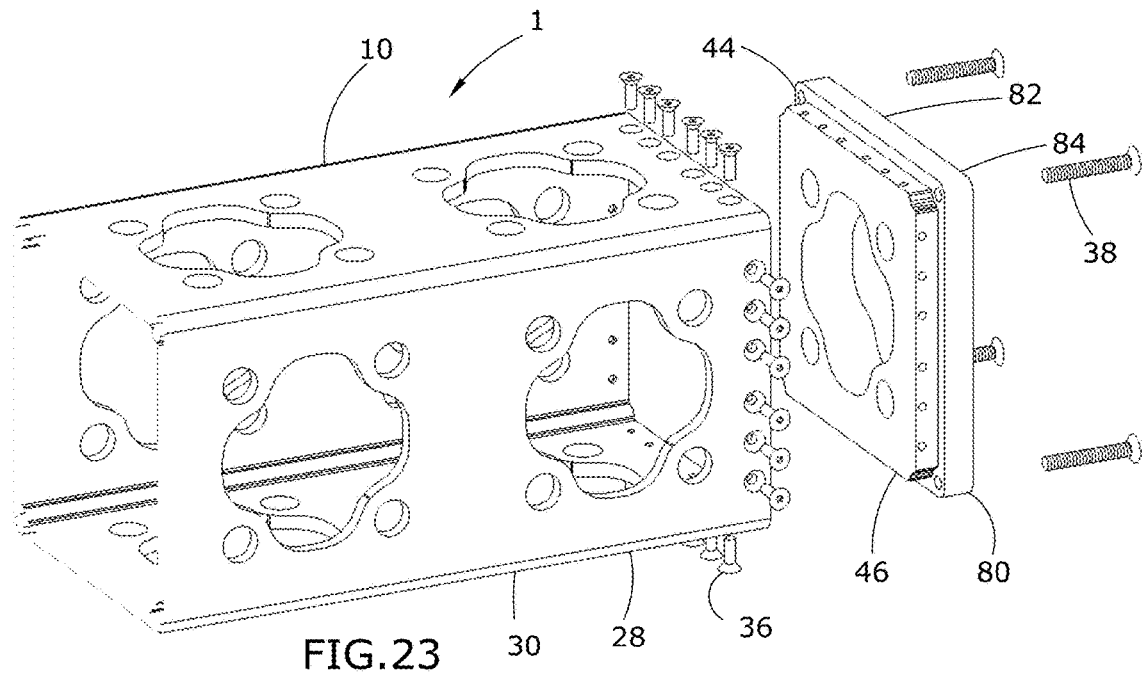
FIG. 23 is a rear exploded perspective view of a tubular beam with a fastened end plate having both parallel and perpendicular fasteners utilizing a second embodiment of an end plate in accordance with the present invention.
Figure 24:
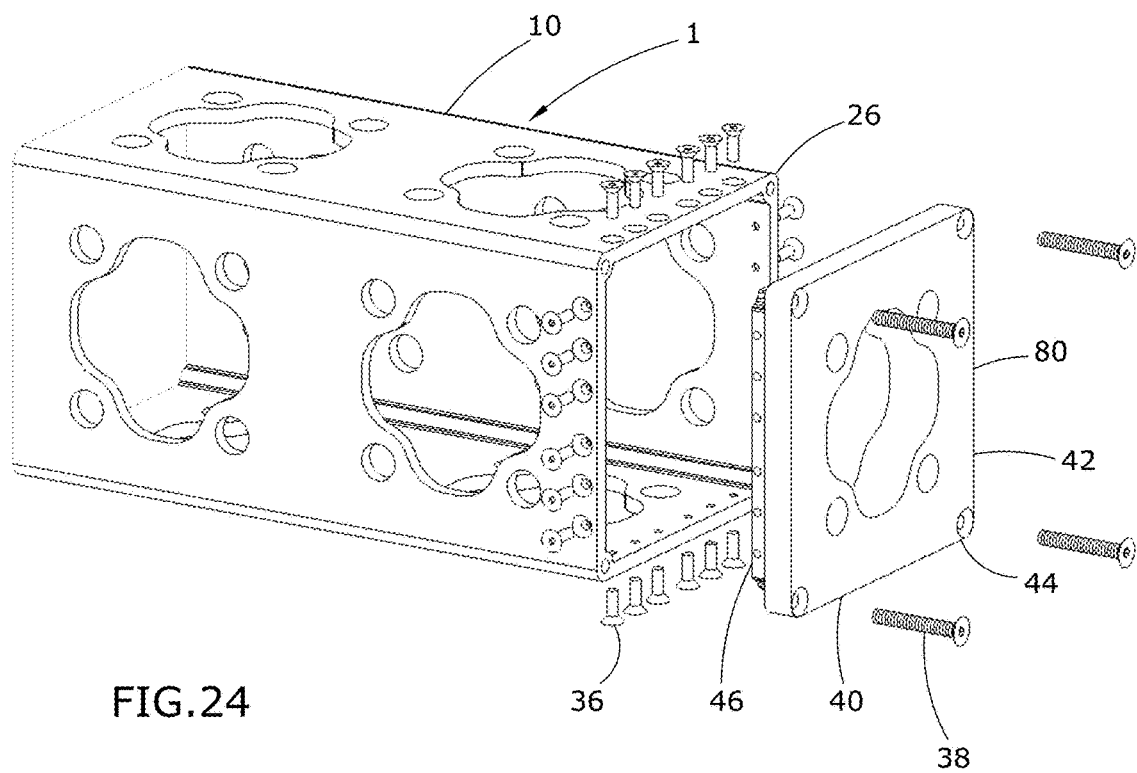
FIG. 24 is a front exploded perspective view of a tubular beam with a fastened end plate having both parallel and perpendicular fasteners utilizing a second embodiment of an end plate in accordance with the present invention.

With reference to FIGS. 22-24, a fastened end plate 80 is attached to an end of the tubular beam 10. The fastened end plate 80 includes a stepped perimeter 82, four gusset clearances 84, the plurality of parallel fastener holes 44 and the plurality of blind fastener holes 46. The stepped perimeter 82 is sized to be received by an inner perimeter of the tubular beam 10. The gusset clearances 84 are formed in each corner of the stepped perimeter 82 to provide clearance for the fastener gussets 24. An outer perimeter of the fastened end plate 80 is the same size as an outer perimeter of the tubular member 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tubular beam with at least one mechanically fastened end plate for construction of structures, comprising:
    a tubular member having at least three side walls, a plurality of hand openings formed through at least one of said three side walls, each one of said plurality of hand openings is adapted to allow a hand to pass therethrough, a plurality of beam fastening holes are formed through at least one of said three side walls, a plurality of fastener holes are formed through at least two side walls on at least one end of said tubular member;
    at least one mechanically fastened end plate includes a plurality of plate fastening holes, a perimeter of said at least one mechanically fastened end plate is sized to be received by an inner perimeter of said tubular member, a plurality of blind fastener holes are formed in at least two sides of said at least one mechanically fastened end plate; and
    a plurality of fasteners are inserted through said plurality of fastener holes and secured in said plurality of blind fastener holes.

2. The tubular beam with at least one mechanically fastened end plate for construction of structures of claim 1 wherein:
    said at least one mechanically fastened end plate includes a plate hand opening, said plate hand opening is adapted to allow a hand to pass therethrough.

3. The tubular beam with at least one mechanically fastened end plate for construction of structures of claim 1 wherein:
    a cross section of said tubular member and a perimeter of said at least one plate has a square, rectangular, triangular or hexagonal shape.

4. The tubular beam with at least one mechanically fastened end plate for construction of structures of claim 1 wherein:
    a plurality of cross fastener holes are formed through at least two side walls along a length of said tubular member.

5. The tubular beam with at least one mechanically fastened end plate for construction of structures of claim 4 wherein:
    a cross plate includes a plurality of cross blind fastener holes formed in at least two sides, a plurality of cross fasteners are inserted through said plurality of cross fastener holes and secured in said plurality of cross blind fastener holes.

6. The tubular beam with at least one mechanically fastened end plate for construction of structures of claim 1 wherein:
    at least one of a plurality of weight reduction openings and are formed through said at least one sidewall of said tubular member.

7. The tubular beam with at least one mechanically fastened end plate for construction of structures of claim 1 wherein:
    a plurality of fasteners are inserted through at least two of said plurality of beam fastening holes and said plurality of plate fastening holes to secure two adjacent tubular beams to each other.

8. A tubular beam with at least one mechanically fastened end plate for construction of structures, comprising:
    a tubular member having at least three side walls, a plurality of hand openings formed through at least one of said three side walls, each one of said plurality of hand openings is adapted to allow a hand to pass therethrough, a plurality of beam fastening holes are formed through at least one of said three side walls, a fastener gusset is formed in all inner corners of said tubular member, a blind fastener hole is formed in at least one end of said fastener gusset; and
    at least one mechanically fastened end plate includes a plurality of plate fastening holes, a plate fastener hole is formed in each corner of said mechanically fastened end plate; and
    a plurality of fasteners are inserted through said plurality of plate fastener holes and secured in said plurality of blind fastener holes.

9. The tubular beam with at least one mechanically fastened end plate for construction of structures of claim 8 wherein:
    said at least one mechanically fastened end plate includes a plate hand opening, said plate hand opening is adapted to allow a hand to pass therethrough.

10. The tubular beam with at least one mechanically fastened end plate for construction of structures of claim 8 wherein:
    a cross section of said tubular member and a perimeter of said at least one plate has a square, rectangular, triangular or hexagonal shape.

11. The tubular beam with at least one mechanically fastened end plate for construction of structures of claim 8 wherein:
    a plurality of cross fastener holes are formed through at least two of said three side walls along a length of said tubular member.

12. The tubular beam with at least one mechanically fastened end plate for construction of structures of claim 11 wherein:
    a cross plate includes a plurality of cross blind fastener holes formed in at least two sides, a plurality of cross fasteners are inserted through said plurality of cross fastener holes and tightened in said plurality of cross blind fastener holes.

13. The tubular beam with at least one mechanically fastened end plate for construction of structures of claim 8 wherein:
a plate tab extends from each corner of said at least one mechanically fastened end plate, a tab notch is formed in each corner of said tubular member to provide clearance for said end plate tab, said end plate is sized to receive by an inner perimeter of said tubular member, said plate fastener hole is formed through each said plate tab.

14. The tubular beam with at least one mechanically fastened end plate for construction of structures of claim 8 wherein:
a plurality of weight reduction openings are formed through said at least one sidewall.

15. The tubular beam with at least one mechanically fastened end plate for construction of structures of claim 8 wherein:
a plurality of fasteners are inserted through at least two of said plurality of beam fastening holes and said plurality of plate fastening holes to secure two adjacent tubular beams to each other.

16. The tubular beam with at least one mechanically fastened end plate for construction of structures of claim 8 wherein:
additional fastening openings are formed in said at least one end plate.

17. A tubular beam with at least one mechanically fastened end plate for construction of structures, comprising:
a tubular member having at least three side walls, a plurality of hand openings formed through at least one of said three side walls, each one of said plurality of hand openings is adapted to allow a hand to pass therethrough, a plurality of beam fastening holes are formed through at least one of said three side walls, a plurality of perpendicular fastener holes are formed through at least two side walls on at least one end of said tubular member, a fastener gusset is formed in all inner corners of said tubular member, a blind fastener hole is formed in at least one end of said fastener gusset; and
at least one mechanically fastened end plate includes a plurality of plate fastening holes, a perimeter of said at least one mechanically fastened end plate is sized to be received by an inner perimeter of said tubular member, a plurality of blind fastener holes are formed in at least two sides of said at least one mechanically fastened end plate, a plurality of perpendicular fasteners are inserted through said plurality of perpendicular fastener holes and secured in said plurality of blind fastener holes, a plate tab extends from each corner of said at least one mechanically fastened end plate, a parallel fastener hole is formed through each said plate tab to receive a plurality of parallel fasteners, a tab notch is formed in each corner of said tubular member to provide clearance for said end plate tab.

18. The tubular beam with at least one mechanically fastened end plate for construction of structures of claim 17 wherein:
said at least one mechanically fastened end plate includes a plate hand opening, said plate hand opening is adapted to allow a hand to pass therethrough.

19. The tubular beam with at least one mechanically fastened end plate for construction of structures of claim 18 wherein:
a cross section of said tubular member and a perimeter of said at least one plate has a square, rectangular, triangular or hexagonal shape.

20. The tubular beam with at least one mechanically fastened end plate for construction of structures of claim 18 wherein:
a plurality of cross fastener holes are formed through at least two side walls along a length of said tubular member, a cross plate includes a plurality of cross blind fastener holes formed in at least two sides, a plurality of cross fasteners are inserted through said plurality of cross fastener holes and tightened in said plurality of cross blind fastener holes.

* * * * *